Patented Aug. 15, 1939

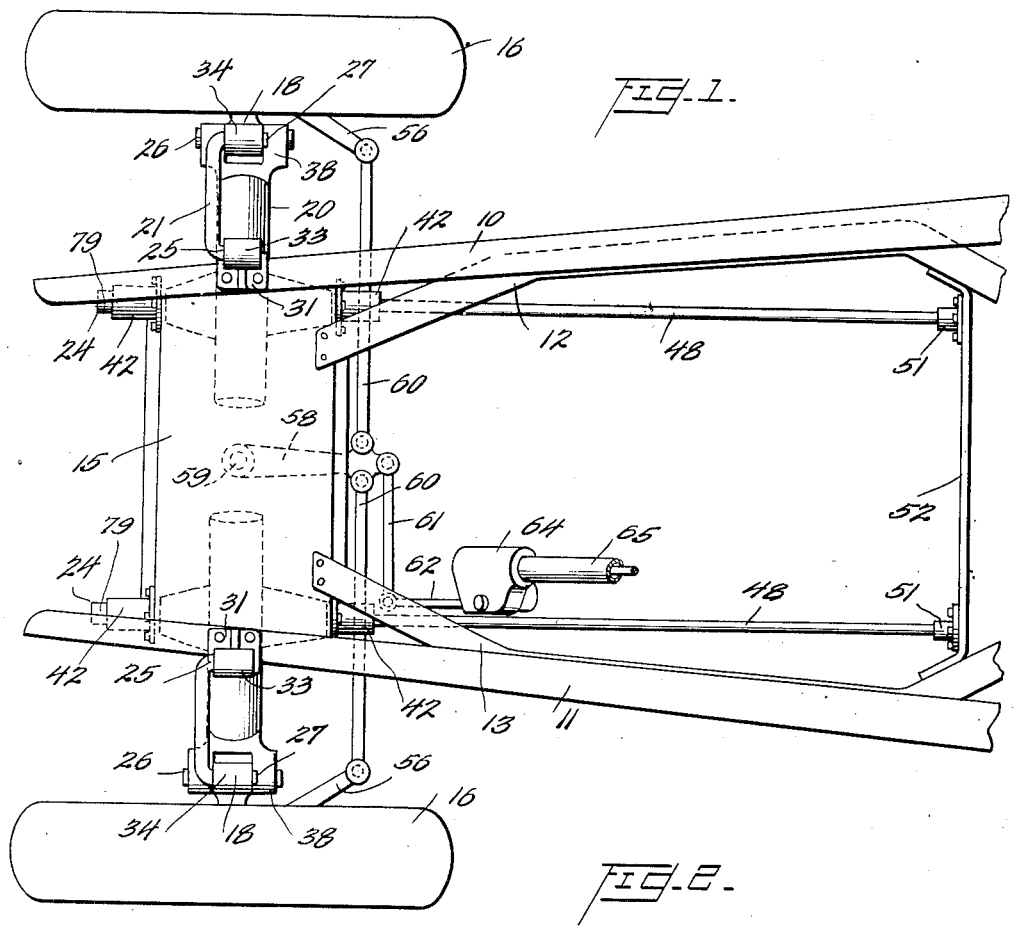
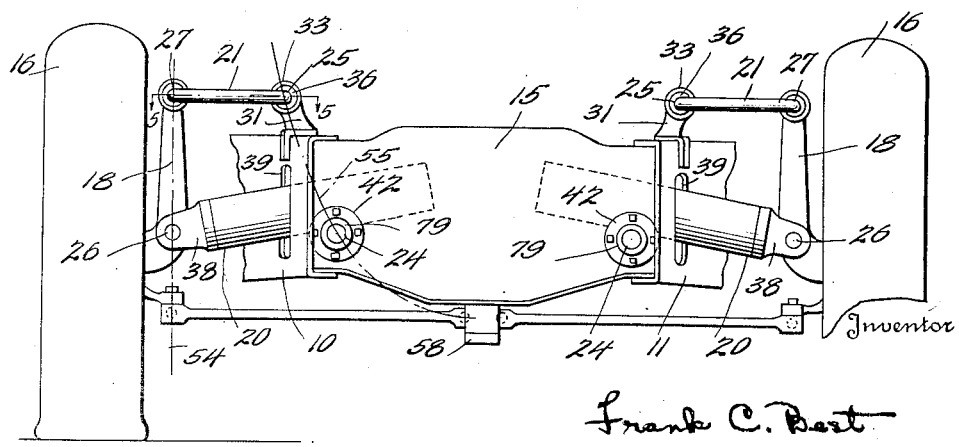

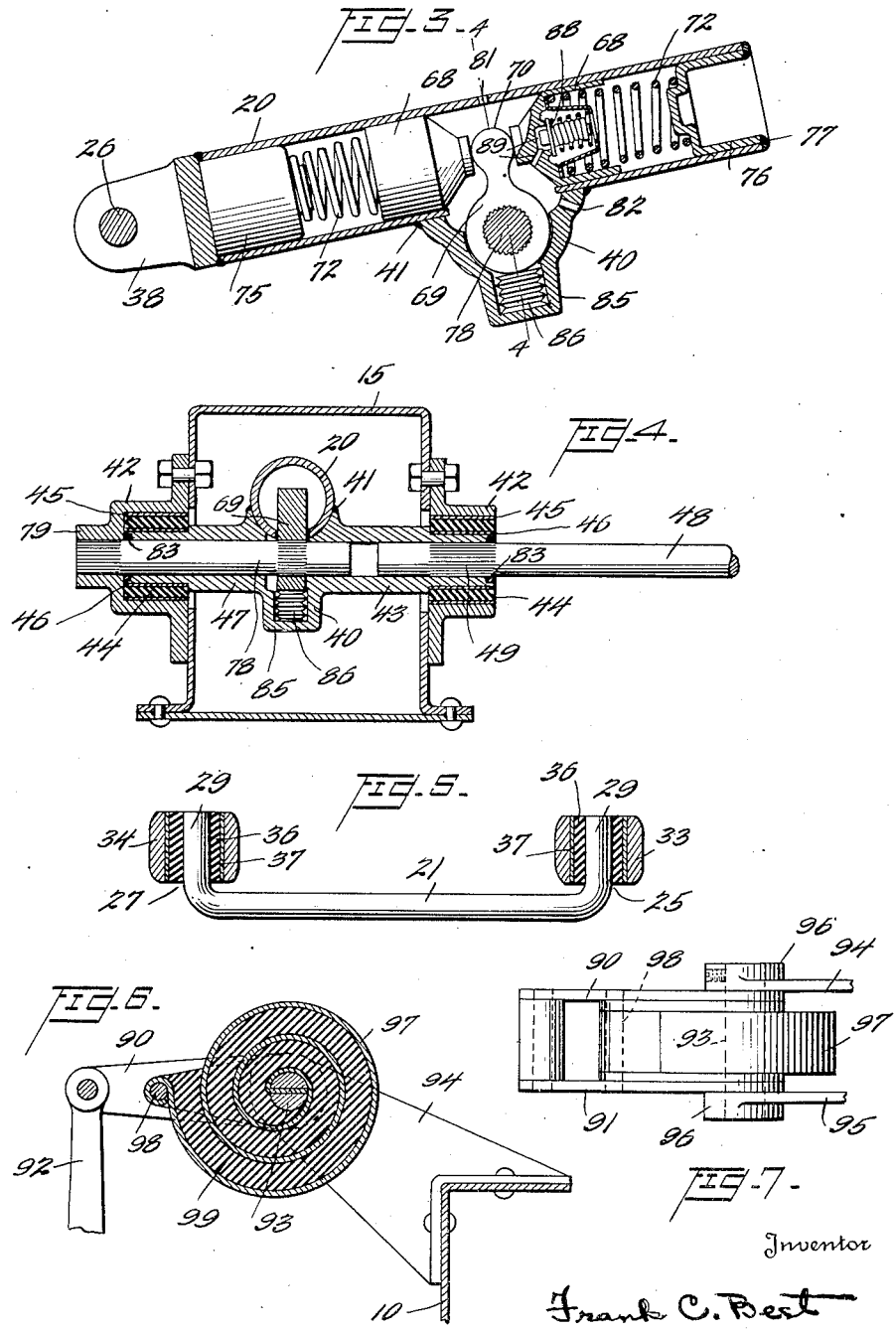

2,169,335

UNITED STATES PATENT OFFICE 2,169,335

MOTOR VEHICLE

Frank C. Best, Detroit, Mich., assignor to Packard Motor Car Company, Detroit, Mich., a corporation of Michigan Application June 12, 1936, Serial No. 84,929

6 Claims. (Cl. 267—57)

This invention relates to motor vehicles and more particularly to vehicle wheel suspension mechanism. It is the principal object of the invention to provide a wheel suspension which is simple and inexpensive to construct and which will afford improved riding qualities and freedom from vibrational disturbances, and which is further characterized by minimum of weight with maximum resistance to the stresses to which a wheel suspension is ordinarily subjected during operation of the vehicle. The invention is applicable to the suspension either of the forward steering wheels or of the rear driving wheels.

One feature of the invention comprises the utilization of an element of the wheel suspension as a shock absorbing unit. For example, in its preferred form the invention contemplates the employment of the so-called parallel link type of suspension in which oppositely disposed road wheels are supported for rising and falling movement independently of each other, and it is proposed to employ one or more of the links as shock absorbers with resultant economy of space and reduction of expense. It will be understood that the term "shock absorber" is used herein in its ordinary sense to describe mechanism capable of strongly resisting and retarding rapid relative accelerative movement of the road wheels and frame, such mechanism usually offering much less resistance to gradual or slow relative displacement thereof.

More specifically, it is an object of the invention to provide a wheel suspension of the parallel link type, one of the links of each pair being of tubular construction, whereby increased rigidity and resistance to torsional stress is obtained, and to employ this tubular link as the cylinder of a fluid shock absorber, piston means being provided within the link for displacement therein in response to rising and falling movement of the link and associated road wheel. Preferably the link performing this dual function is that one of each pair which carries the principal stresses and loads, for example the lower link, and the points of pivotal connection of this link to the frame are spaced comparatively widely to afford adequate resistance to braking torque and longitudinal thrust on the road wheel. The upper link of each pair is preferably of extremely simple construction and light weight, being required to tranrmit a relatively small amount of thrust and load and functioning principally as a guide to ensure the execution by the road wheel of proper rising and falling movement with respect to the frame.

It has been heretofore proposed in wheel suspensions of the parallel link type to so proportion the relative lengths of the links of each pair as to minimize tread variation and to establish a change in camber as the wheel rises such that the vehicle may be easily steered. It is a feature of this invention that these advantages are retained and at the same time the length of both links is materially reduced by disposing these links in planes which are considerably higher from the road bed than has heretofore been proposed, for example above the axis of rotation of the associated road wheel.

It is a further object of the invention to provide a wheel suspension of the independent type in which the conventitonal leaf or coil compression springs are replaced by torsion means. In the preferred form of the invention this torsion means consists of a metallic bar which may be connected at one of its ends to the frame and at its other end to a wheel supporting link substantially in the axis of pivotal connection of the latter to the frame.

Further objects and features of the invention will be apparent from the following description taken in connection with the accompanying drawings in which Figure 1 is a plan view of the forward end of a vehicle illustrating the application thereto of one form of the present invention;

Figure 2 is an end elevation of the structure shown in Figure 1;

Figure 3 is a vertical sectional view through one of the wheel supporting links shown in Figures 1 and 2;

Figure 4 is a transverse sectional view on the line 4—4 of Figure 3;

Figure 5 is a sectional view taken substantially on the line 5—5 of Figure 2;

Figure 6 is a fragmentary sectional view illustrating a modified form of spring means and shock absorber capable of use in the suspensions shown in Figures 1 and 2; and Figure 7 is a plan view of the structure shown in Figure 6.

In order to facilitate an understanding of the invention, reference is made herein to the embodiment thereof selected for the purpose of illustration and shown in the accompanying drawings and specific language is employed to describe the same. It will nevertheless be understood that no limitation of the invention is thereby intended and that various alterations and modifications are contemplated such as would suggest themselves to one skilled in the art. For example, various features of the invention which are shown as applied to a vehicle suspension of the independent type are equally applicable to other types of suspension, and it will be apparent that a number of the structural details may be varied to a considerable extent without essential alteration of the function performed.

Referring first to Figures 1 and 2, it will be observed that the vehicle frame is represented as comprising side frame members 10 and 11, these members being of channel section and receiving therein oppositely directed channel members designated 12 and 13 respectively, the latter serving to reinforce the side frame members 10 and 11 and having rearwardly directed continuations forming an X frame structure (not shown) near the central portion of the vehicle frame. Extending between and secured to the side frame members 10 and 11 is a cross frame member 15, having the ends thereof seated within the inwardly directed flanges on the side frame members. The frame structure thus far described is conventional and the details thereof form no part of the present invention.

The oppositely disposed road wheels 16 are supported in the conventional manner for steering movement about generally upright axes on wheel carrying members 18, the members 18 and the associated steering knuckles and road wheels being referred to for convenience herein as road wheel assemblies.

Each road wheel is illustrated as supported on a pair of laterally extending, generally superimposed links, the lower link being indicated at 20 and the upper link at 21. The lower and upper links are pivoted respectively to the frame at 24 and 25 and to the wheel supporting member 18 at 26 and 27. Preferably the pivotal axes of the links are parallel and are so arranged that when the road wheel occupies its normal position in which it is shown in the drawings, the links are disposed substantially horizontally; in other words, a plane containing the inner and outer pivotal axes of each link is preferably but not necessarily substantially horizontal.

The upper link 21 of each pair is preferably formed very inexpensively from an elongated bar of metal. As shown in Figure 5, this bar is bent at each end to provide leg portions 29, the latter being received in suitable pivot bearings provided on the frame and the wheel supporting member 18. For example, a bracket 31 may be secured to the adjacent side frame member 10, the bracket being provided with a boss 33, a similar boss 34 being formed on the wheel supporting member 18. The legs 29 of the link 21 may be journalled in these bosses in the conventional manner, but I prefer to employ annular elements 36 of deformable material such as rubber, these annular elements being surface bonded to the legs 29 of the link and to sleeves 37, the latter being received within the bosses 33 and 34 with a press fit. This type of pivotal connection requires no lubrication, the rubber annuli being merely stressed as the wheel supporting member 18 rises and falls. Furthermore, the soft material of which the annuli are formed effectively prevents the transmission of shocks and vibrations from the wheel assembly to the vehicle frame.

Each of the lower links 20 is provided at its outer end with laterally projecting apertured ears 38 which are suitably fulcrumed on the member 18, and the body of the link is of generally tubular shape, being referred to herein as a cylinder because of its function as such, although it will be appreciated that it need not be circular in section. Each link 20 extends through an aperture 39 in the adjacent side frame member 10 and into the cross frame member 15 and is secured intermediate its ends, but adjacent its inner end, to a housing and supporting member 40, for instance by welding as at 41. Bearing brackets 42 are secured to the depending forward and rearward walls of the cross frame member 15, which is of box or closed section as shown in Figure 4, to receive the opposite ends of the sleeve portions 43 and 47 of the member 40, annuli 44 of rubber or other deformable material being interposed between the member and the brackets 42. These annuli may be vulcanized or otherwise surface bonded to sleeves 45 and 46 which are respectively pressed in position within the brackets 42 and about the sleeve portions of the members 40, the latter being thereby supported for rocking movement within the cross frame member 15, the rubber annuli 44 being stressed during such movement.

A torsion member 48 in the form of an elongated metallic bar extends within and is secured to the sleeve portion 43 of the member 40, for instance by ribs or splines as indicated at 49. It will be observed from Figure 1 that the bars 48 extend generally longitudinally of the vehicle and are secured at their rearward ends in brackets 51 which are in turn mounted on a transversely extending member 52, the latter being secured at its ends to the reinforcing channel members 12 and 13.

It will be observed from the structure thus far described that the road wheels 16 are permitted to rise and fall with respect to the vehicle frame, the links 20 and 21 swinging about their points of pivotal connection to the vehicle frame. Upward movement of either road wheel is yieldingly resisted by the associated bar 48 which acts through the lower link 20, the torsional stress thus applied to the bar being sufficient to temporarily twist or deflect the same but insufficient to effect permanent deformation thereof. Since the bars 48 can be readily and cheaply formed and occupy a comparatively small space in the vehicle structure, this type of suspension offers very decided advantages over the more conventional suspensions employing bulky and expensive coil and leaf springs. It will also be appreciated that the torsion bar may be readily designed to afford the more desirable characteristics of the coil spring, such as low rate, and is not characterized by static friction as is the leaf spring.

Referring now to Figure 2, it will be observed that the axes of pivotal connection between the links and each wheel supporting member 18 are located in a substantially vertical longitudinal plane represented by the line 54 and that the axes of pivotal connection of these links to the frame are located on a curved line 55. The upper link 21 is shorter than the lower link 20, the relative length of the links being such that as the road wheel rises, the tread portion of the wheel in contact with the road bed moves in a generally vertical plane, the upper portion of the wheel being displaced inwardly to produce this result. A slight change in camber is thereby produced as the wheel rises, this change being sufficient to prevent excessive steering recovery as the vehicle rounds a curve. It has heretofore been the practice in a suspension of this type to dispose the links at a relatively low point, the lower link being usually pivoted to the vehicle frame beneath the associated side frame member. It is now found, however, that both links of each pair can be elevated to a considerable extent without affecting the tread variation or the camber change as long as the inner ends of the links are pivoted to the frame at points lying on the curved line 55. It will be readily appreciated from the shape of this curve that as the links are elevated, their length is lessened and by locating the links above the rotational axis of the road wheel they may be very materially shortened, whereby a substantial reduction in weight may be effected. Thus the links will weigh less, not only because of their decreased length, but because it is possible to employ links of less transverse dimensions by reason of the lowered strength required in a shorter link. In this way the unsprung weight of the vehicle is materially reduced.

Steering may be effected in any convenient manner, but the steering mechanism shown in Figures 1 and 2 is preferred. This mechanism comprises steering arms 56 extending rearwardly from and secured to each road wheel assembly so as to effect steering movement thereof about the conventional steering knuckle. A steering lever 58 is pivoted at 59 centrally of and beneath the cross member 15 and steering links 60 connect the steering lever with each of the steering arms 56, the points of pivotal connection of the steering links with the arms 56 lying substantially in the vertical longitudinal plane containing the outer link axes and the points of connection of the steering links with the lever 58 lying in continuations of the curves 55 as viewed in end elevation in Figure 2. Since the curves 55 represent the locus of points which may be employed for link connections between the frame and the wheel assembly without alteration of the road wheel movement, it is obvious that as the road wheels rise and fall there will be no relative displacement of the steering links 60 or of other parts of the steering mechanism, perfect steering being thereby secured. The steering lever 58 may be connected through a drag link 61 to a steering drop arm 62 which is actuated in a conventional manner by gearing within a housing 64 from a hand wheel at the upper end of the steering column 65.

Referring now to Figure 3, it will be observed that each lower link 20 is constructed to afford a cylinder within which may be reciprocated oppositely acting pistons 68, an arm 69 having a rounded outer end 70 engaging the adjacent ends of the pistons The pistons are urged toward the arm 69 and maintained in engagement therewith by means of coil springs 72 which are disposed within the link and which abut spacing elements 75 and 76, the latter being welded in position as indicated at 77 so as to seal the body of the link to form with the member 40 a completely enclosed housing.

The arm 69 is secured to a shaft 78 which extends forwardly within the sleeve portion 47 of the member 40 and is received within a boss 79 formed on the adjacent bracket 42, being rigidly secured therein by the employment of co-operating ribs or splines.

The link 20 is provided in its upper side with a filling plug 81 and a plugged opening 82 is provided in the lower side of the member 40, whereby the housing afforded by the link and member 40 may be completely filled with fluid and all air excluded. Leakage of fluid from the member 40 is prevented by means of annular seals 83 at either end of the sleeve portions thereof, being formed for instance of rubber and surface bonded to the member 40 and to the shaft 78 and bar 48.

The member 40 is provided with an enlarged portion 85 in which may be received a sealed compressible compartment 86, the latter containing air. The purpose of this compartment is to ensure against the development of excessive pressures in the fluid system as the result of increase in temperature and resultant expansion of fluid, the compartment collapsing to compensate for such expansion.

Each of the pistons 68 is provided with a conventional type of valve, indicated generally at 88, these valves permitting free flow of fluid through the passages 89 in the heads of the pistons in a direction away from the intermediate operating lever 69, but restricting flow of fluid in the opposite direction.

The mode of operation of the mechanism just described will be at once apparent. As either road wheel rises and falls, the associated link 20 will rock about its axis of pivotal connection to the vehicle frame. The associated actuating arm 69 is, however, retained against rotation and displaces within the cylinder afforded by the link either one or the other of the pistons 68, depending on the direction of movement of the road wheel, whereby rapid accelerative movements of the road wheel are resisted or retarded, the mechanism thus functioning in the same manner as more conventional types of shock absorbers.

Under some circumstances it is found desirable to employ a shock absorber of this type in connection with conventional rigid axle suspensions and it is by no means essential that the shock absorber constitute one of the wheel supporting links. It will nevertheless be appreciated that considerable economy in expense and space is effected by the arrangement illustrated herein.

Referring now to Figures 6 and 7, it will be observed that a modified form of suspension is shown in which the yielding means resisting rising movement of the road wheels with respect to the frame is associated with the upper rather than the lower link. Thus the upper link is pivotally connected to the wheel supporting member 92 and to a bracket comprising spaced arms 94 and 95, the bracket being secured to the adjacent side frame member 10. The link is formed of two elements 90 and 91 which are mounted for swinging movement at their inner ends on a short shaft 93, the latter extending between and being secured in bosses 96 at the outer ends of the bracket arms 94 and 95. A flat spiral spring 97, coiled as shown in Figure 6, is secured at one end to the shaft 93 and at the other end to an element 98 extending between and secured in the link elements 90 and 91. Intermediate the adjacent convolutions of the spring 97 is a thick strip of rubber or other deformable material 99, this strip being vulcanized or otherwise surface bonded to the spring convolutions.

It will be observed that as the road wheel rises, such rising movement will be resisted not only by the coil spring 97 which thus functions in the manner of the more conventional types of vehicle supporting spring, but the relative displacement of adjacent convolutions of the spring will cause distortion of the rubber and consequent absorption of shock and damping of vibrations due to the internal hysteresis of the rubber, the energy of vibration being rapidly dissipated in the form of heat. It is found that the rubber functions much in the manner of the more conventional type of shock absorber, tending to resist rapid accelerative movement of the road wheel with respect to the frame.

When reference is made herein to a shock absorber or to shock absorbing means, it is understood that the term is used in its ordinary sense to designate a device offering considerable resistance to accelerative displacement of the road wheels while offering very much less resistance to motion other than accelerative motion.

Having thus described the invention, what is claimed as new and desired to be secured by Letters Patent is:

1. In a wheel suspension for motor vehicles, the combination with a vehicle frame, of oppositely disposed road wheel assemblies, and means supporting siad wheel assemblies on said frame for independent rising and falling movement with respect thereto, said means including a pair of laterally extending wheel supporting links pivotally connected to said frame and to each of said road wheel assemblies on transverse axes, said links being of different effective length, the point of pivotal connection between each link of each pair and the associated wheel assembly being disposed above the rotational axis of the wheel.

2. In a wheel suspension for motor vehicles, the combination with a vehicle frame, of oppositely disposed road wheel assemblies, and means supporting said wheel assemblies on said frame for independent rising and falling movement with respect thereto, said means including a pair of laterally extending wheel supporting links pivotally connected to said frame and to each of said road wheel assemblies on transverse axes, said links being of different effective length, the point of pivotal connection between each link of each pair and the associated wheel assembly being disposed above the rotational axis of the wheel, said links extending generally horizontally in the normal position of the wheel assemblies.

3. In a wheel suspension for motor vehicles, the combination with a vehicle frame, of oppositely disposed road wheel assemblies, and means supporting said wheel assemblies on said frame for independent rising and falling movement with respect thereto, said means including a pair of laterally extending wheel supporting links pivotally connected to said frame and to each of said road wheel assemblies on transverse axes, said links being of different effective length, the point of pivotal connection between each link of each pair and the associated wheel assembly being disposed above the rotational axis of the wheel, and torsion means acting between said frame and one link of each pair for yieldingly resisting upward movement of the associated wheel assembly.

4. In a wheel suspension for motor vehicles, the combination with a vehicle frame, of oppositely disposed road wheel assemblies, and means supporting said wheel assemblies on said frame for independent rising and falling movement with respect thereto, said means including a pair of laterally extending wheel supporting links pivotally connected to said frame and to each of said road wheel assemblies, and torsion means acting between said frame and one link of each pair for yieldingly resisting upward movement of the associated wheel assembly, each such torsion means comprising a spiral spring disposed in a generally vertical plane, and means including rubber interposed between and surface bonded to adjacent convolutions of said spring.

5. In a wheel suspension for motor vehicles, the combination with a vehicle frame, of oppositely disposed road wheel assemblies, and means supporting said wheel assemblies on said frame for independent rising and falling movement with respect thereto, said means including a pair of laterally extending wheel supporting links pivotally connected to said frame and to each of said road wheel assemblies, at least one link of each pair being constructed to afford a housing, shock absorbing means within said housing for retarding accelerative rising movement of the associated road wheel assembly, and a torsion bar acting between said frame and each of said last named links in the axes of pivotal connection of the latter with the frame to yieldingly resist rising movement of the associated wheel assemblies.

6. In a wheel suspension for motor vehicles, the combination with a vehicle frame comprising side frame members and a cross frame member extending between and secured to said side frame members, said cross frame member having an upper generally horizontal base and downwardly directed flanges at each side of said base, of road wheel assemblies at either side of said frame, and means supporting said assemblies on said frame for independent rising and falling movement with respect thereto, said means including a pair of laterally extending links pivoted to said frame and to each of said wheel assemblies, the lower link of each pair extending through the adjacent side frame member and being pivoted to both flanges of said cross frame member at points substantially spaced on a common axis, said lower links being disposed generally horizontally and above the rotational axes of the associated road wheels.

FRANK C. BEST.